Figure 10:
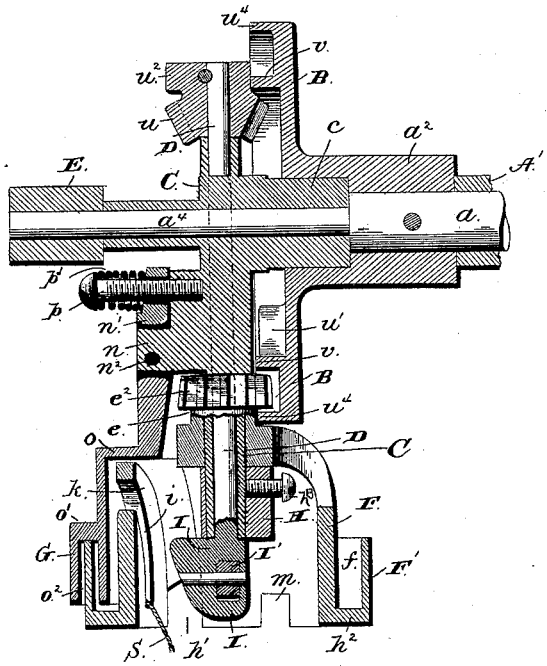

(Model.)
9 Sheets—Sheet 1.
A. O. CARMAN.
KNOTTING DEVICE FOR GRAIN BINDERS.
No. 423,125. Patented Mar. 11, 1890.
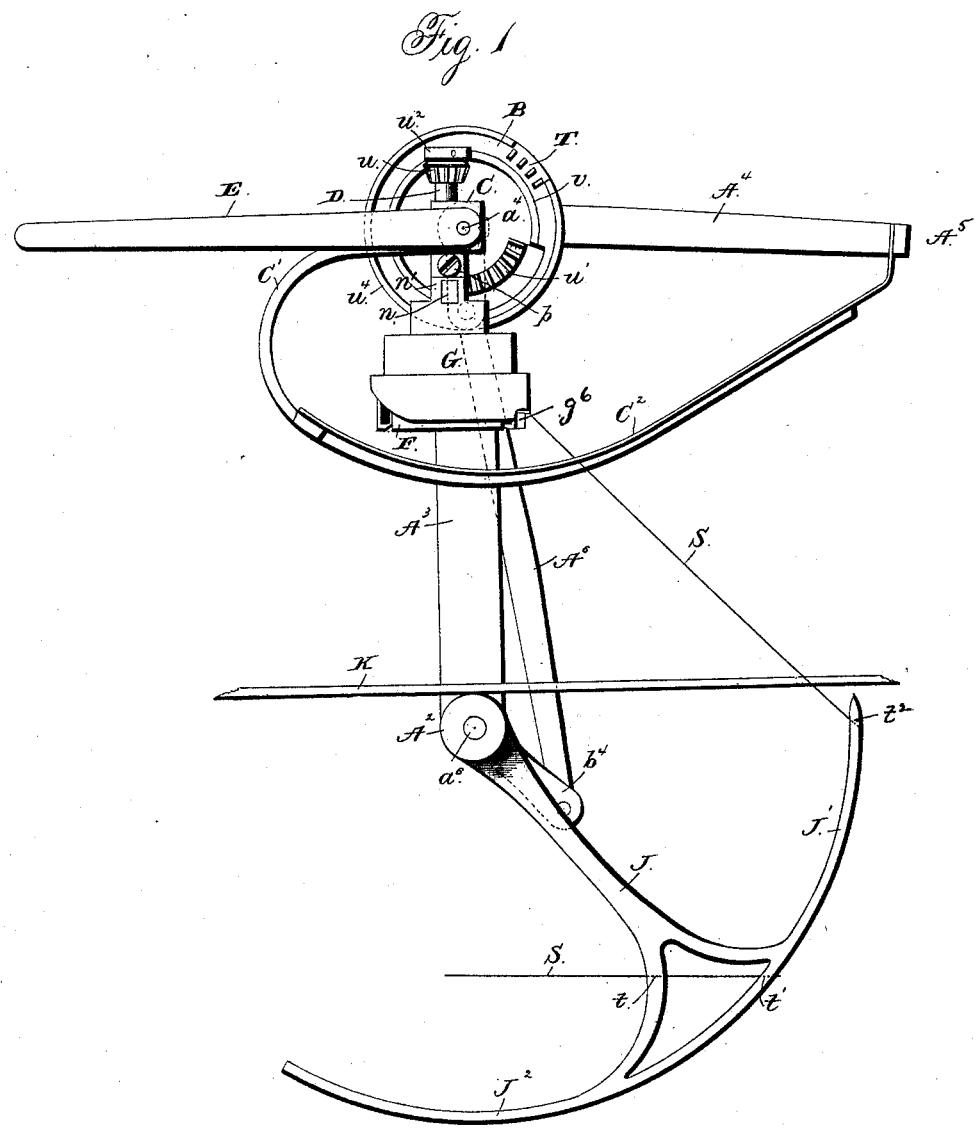
Witnesses.
Jas. E. Hutchinson
G. F. Downing
Inventor
Alvin O. Carman
By his Attorney (Model.) 9 Sheets—Sheet 2.
A. O. CARMAN.
KNOTTING DEVICE FOR GRAIN BINDERS.
No. 423,125. Patented Mar. 11, 1890.
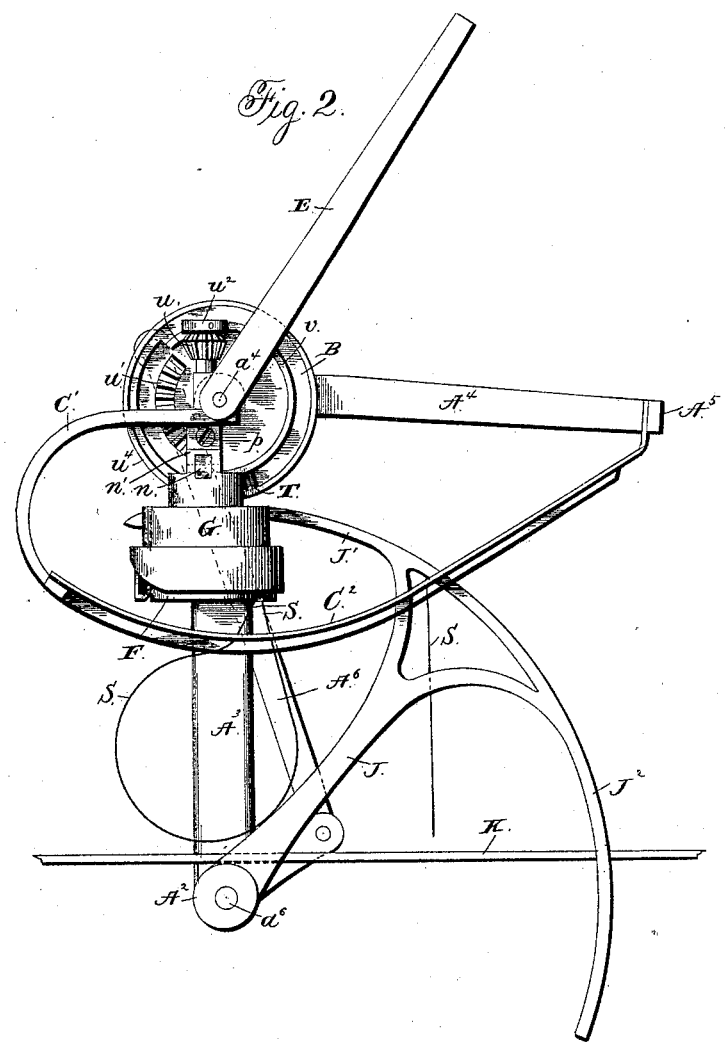
Witnesses
Jas. E. Hutchinson
G. F. Downing
Inventor
Alvin O. Carman
By his Attorney (Model.)
9 Sheets—Sheet 3.
A. O. CARMAN.
KNOTTING DEVICE FOR GRAIN BINDERS.
No. 423,125. Patented Mar. 11, 1890.
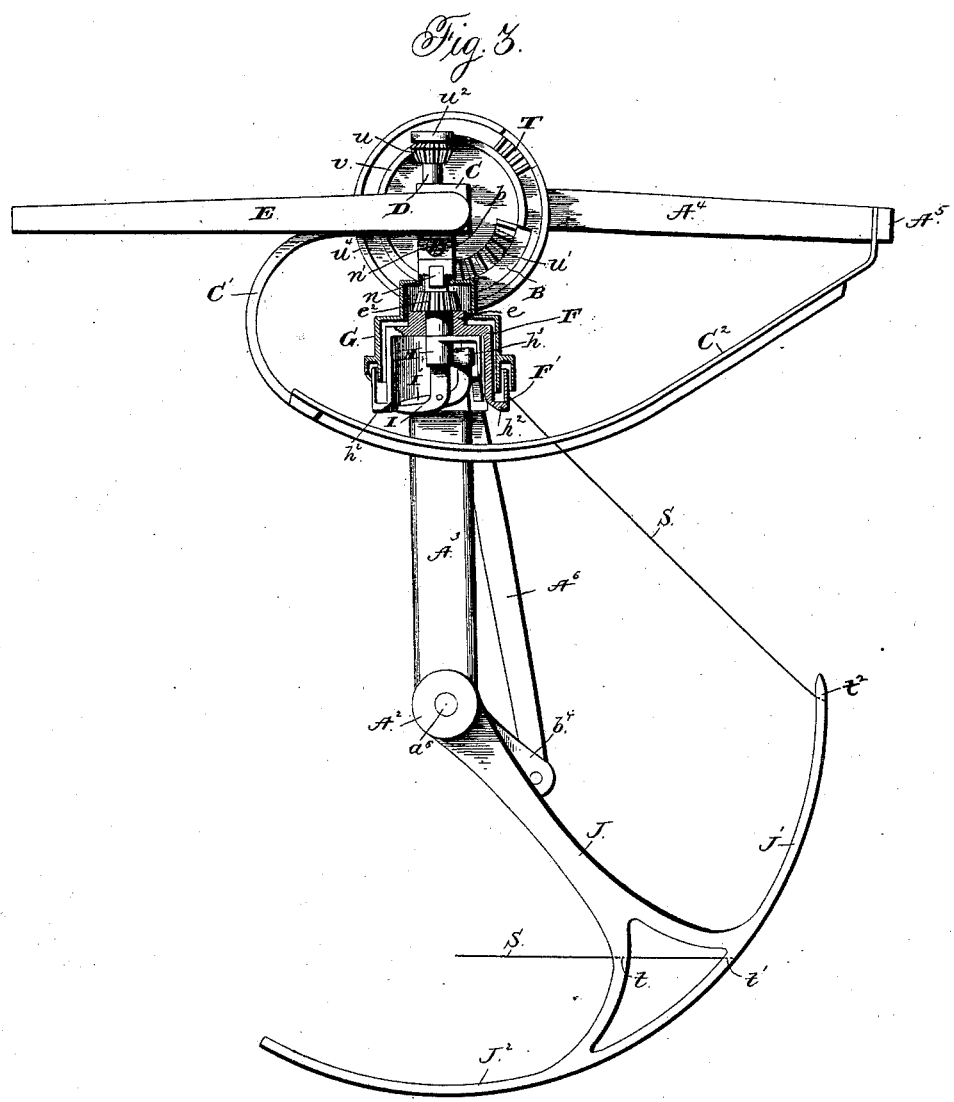

(Model.) 9 Sheets—Sheet 4.
A. O. CARMAN.
KNOTTING DEVICE FOR GRAIN BINDERS.
No. 423,125. Patented Mar. 11, 1890.
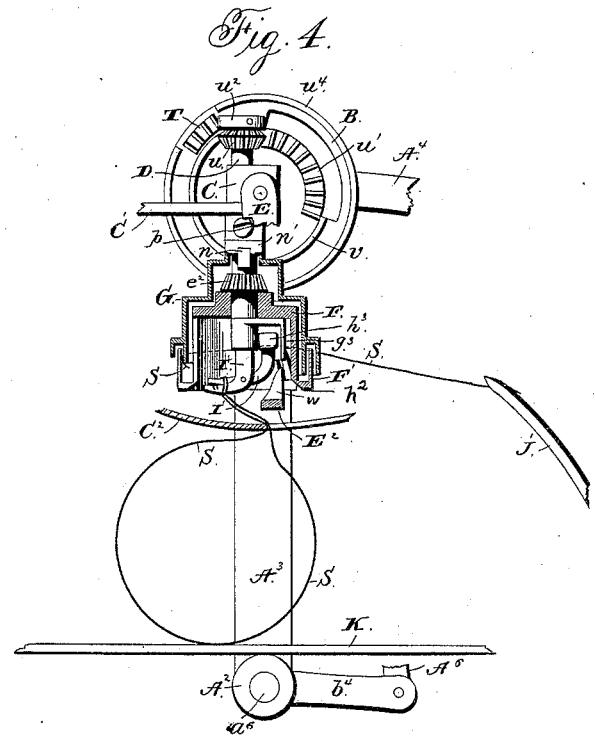
Witnesses
Jas. E. Hutchinson.
G. F. Downing.
Inventor
Alvin O. Carman.
By his Attorney
H. A. Seymour.

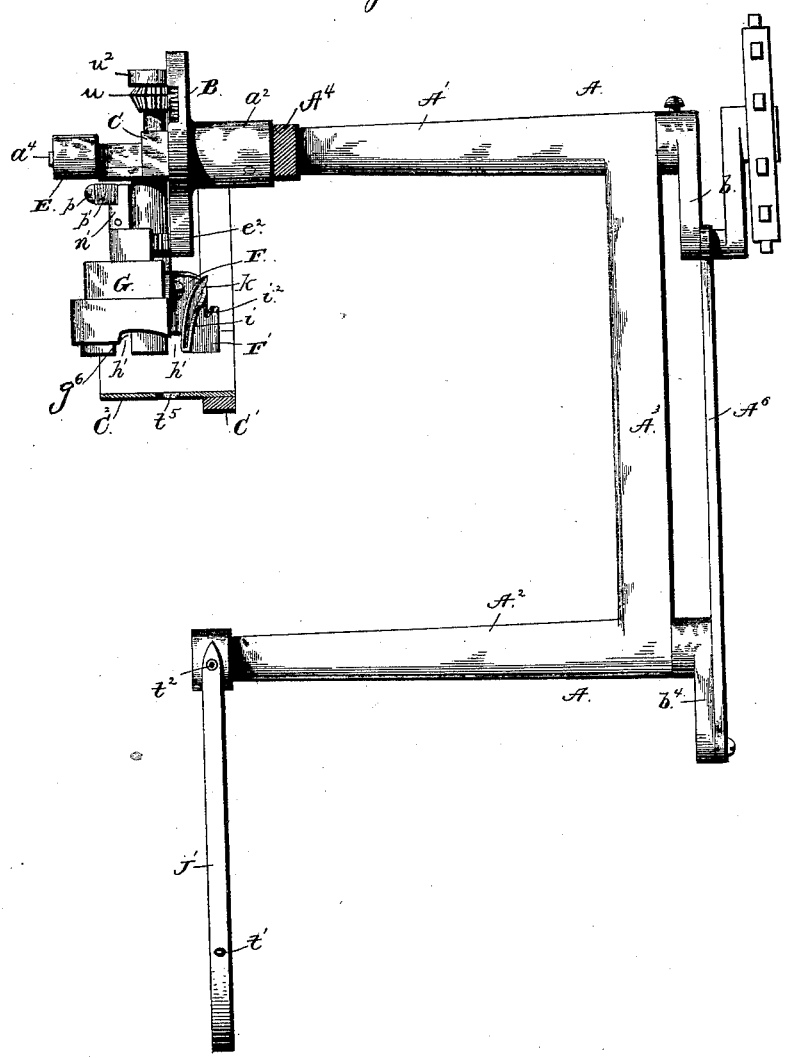

(Model.)
9 Sheets—Sheet 6.
A. O. CARMAN.
KNOTTING DEVICE FOR GRAIN BINDERS.
No. 423,125.  Patented Mar. 11, 1890.
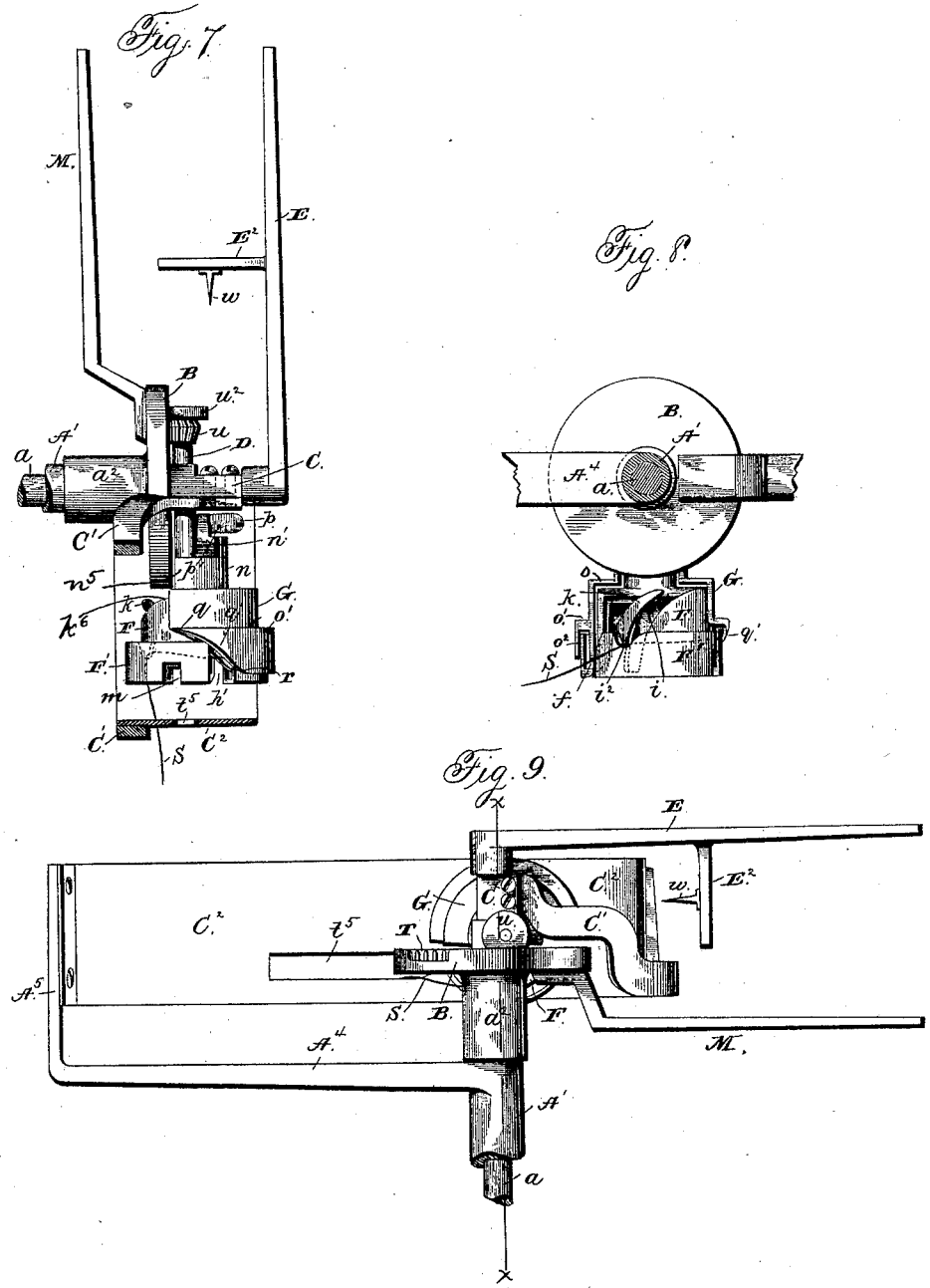
Witnesses
Jas E Hutchinson
G. F. Downing
Inventor
Alvin O. Carman
By his Attorney (Model.) 9 Sheets—Sheet 7.

A. O. CARMAN.
KNOTTING DEVICE FOR GRAIN BINDERS.

No. 423,125. Patented Mar. 11, 1890.

Witnesses
Jas. E. Hutchinson
G. F. Downing

Inventor
Alvin O. Carman
By his Attorney
H. A. Seymour (Model.)
9 Sheets—Sheet 8.
A. O. CARMAN.
KNOTTING DEVICE FOR GRAIN BINDERS.
No. 423,125. Patented Mar. 11, 1890.
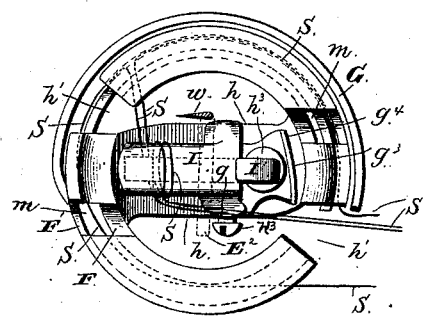
Fig. 12.
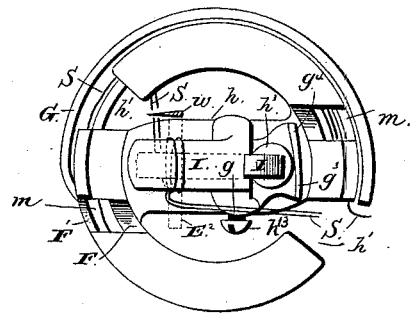
Fig. 13.
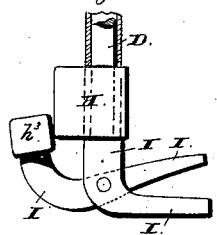
Fig. 14ᵃ.
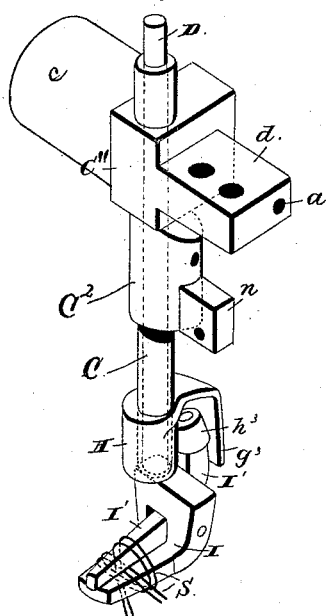
Fig. 14.
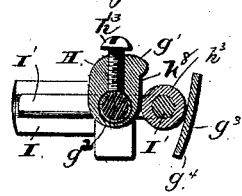
Fig. 14ᵇ.
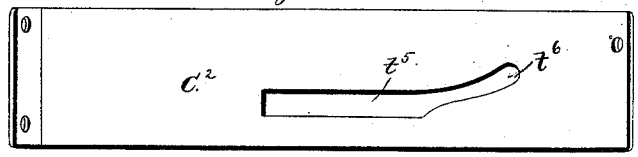
Fig. 15.
Witnesses
Jas. E. Hutchinson
G. F. Downing
Inventor
Alvin O. Carman
By his Attorney (Model.) 9 Sheets—Sheet 9.
A. O. CARMAN.
KNOTTING DEVICE FOR GRAIN BINDERS.
No. 423,125. Patented Mar. 11, 1890.
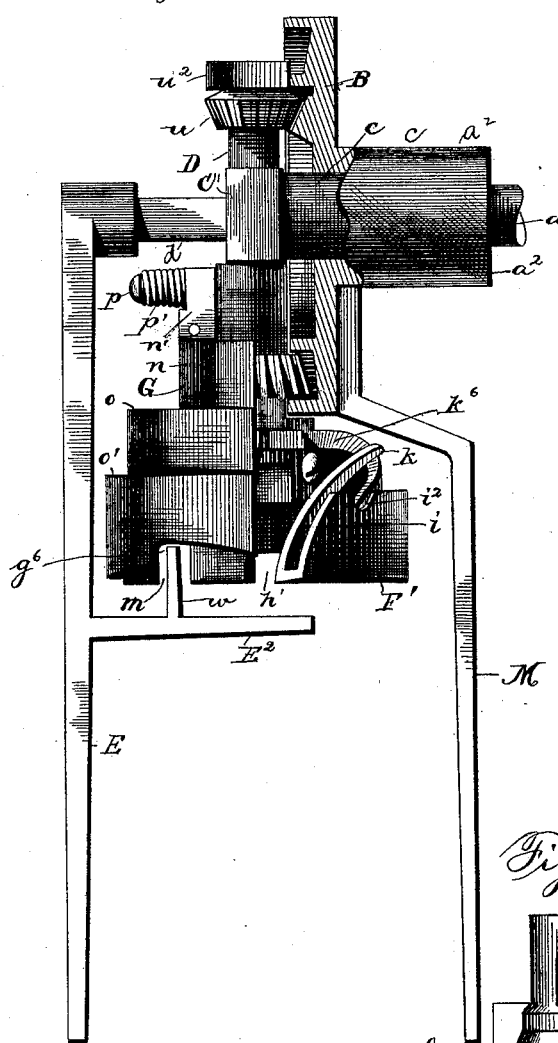
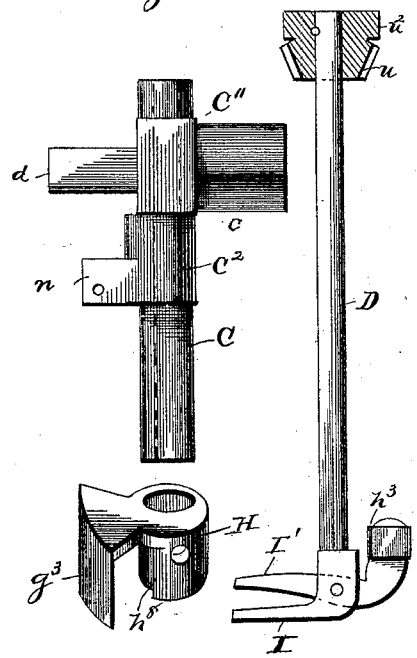
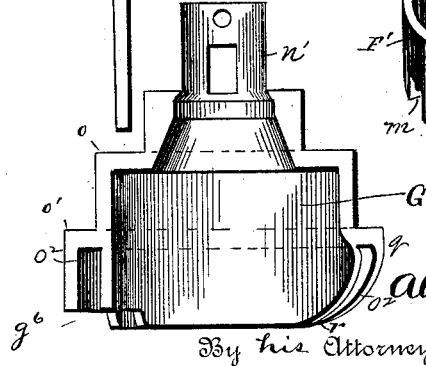
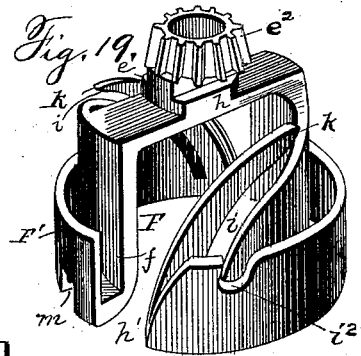
Witnesses
V. E. Hodges
Robt. Aiton
Inventor
Alvin O. Carman
By his Attorney
H. A. Seymour

UNITED STATES PATENT OFFICE.

ALVIN O. CARMAN, OF POTTERVILLE, MICHIGAN.

KNOTTING DEVICE FOR GRAIN-BINDERS.

SPECIFICATION forming part of Letters Patent No. 423,125, dated March 11, 1890.

Application filed May 26, 1888. Serial No. 275,145. (Model.)

*To all whom it may concern:*

Be it known that I, ALVIN O. CARMAN, a resident of Potterville, in the county of Eaton and State of Michigan, have invented certain new and useful Improvements in Knotting Devices for Grain-Binders; and I do hereby declare the following to be a full, clear, and exact description of the invention, such as will enable others skilled in the art to which it appertains to make and use the same.

My invention relates to improvements in knotting devices for grain-binders, and more particularly to a kind in which a rotary shaft carrying a rigid and mating hinged projecting jaw on its free end is employed, these jaws being formed to grasp the doubled strands of the cord which is used to bind a gavel of grain, and by a revoluble movement form a knot in the string or cord to secure the band on the gavel or bundle of grain.

The object of my present invention is to produce a simple and efficient band-knotter of the type mentioned, which will have few working parts, be of compact construction, and capable of production at a low cost.

With these objects in view my invention consists in certain features of construction and combinations of parts, which will be hereinafter described, and pointed out in the claims.

Figure 11:
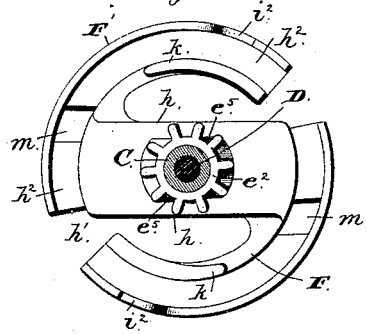

Referring to the drawings making a part of this specification, Figure 1 is a left side elevation of the knotting device in position on a grain-cutting machine, the parts being adjusted to receive a bundle of grain in the bight of the cord which is to form a tying-band. Fig. 2 is a left side elevation of the knotting device, showing the position of parts when a gavel has been gathered in its band by the needle-arm. Fig. 3 is a left side elevation of the knotter mechanism in position to receive a bundle, with the cord-holding cup and shoe broken away to expose the tying-bills and cams that operate them. Fig. 4 is a left side elevation of the knotter device with the cord-holding cup and shoe broken away, showing relative positions of the tying-bills when a gavel has been gathered in its tie-band and knotted ready to be cut loose from the reeled cord. Fig. 5 represents a left side elevation of the device with the cord-holding clamps broken away sufficiently to exhibit the relative position of the tying-bills and their operating-cams when the knot has been tied, the band cut, and the gavel-ejector arms in position to force the tied gavel off of the grain-table of the reaper. Fig. 6 is a view of the front or receiving side of the machine with the breast-plate broken away to show the cord-holder and other parts of the machine, the mechanism being adjusted to receive a bundle or gavel. Fig. 7 is a rear elevation of the device with a portion of the breast-plate broken away. Fig. 8 is a right side elevation of the knotter device with working parts in the position shown in Figs. 1 and 6. Fig. 9 is a top plan view of the knotter device, the parts being adjusted to secure a gavel. Fig. 10 is a front elevation in section, taken through the center of the knotter-shaft. Fig. 11 is a top plan view of the knotter mechanism adjusted to commence the knotting operation, with the outer rim of the knotter-operating wheel broken away to show position of the pinion which revolves the cup and shoe that holds the tying-band. Fig. 12 is a detached and enlarged bottom plan view of the tying-bills, the cord-holding mechanism and knotter-operating cams in the position assumed when the bundle or gavel is introduced into the bight of the tying band or cord. Fig. 13 is a detached and enlarged bottom plan view of the cord-holding, knot-tying, and cord-cutting devices, the parts being in the position assumed when a gavel has been formed in a band knotted and released by severing the cord outside of the knot. Fig. 14 represents a perspective view of the tying-bill shaft and its supporting tubular frame detached from the other parts of the knotter-machine, the cam-hub being in place on the lower end of the frame-piece. Figs. 14$^a$ and 14$^b$ are detached views, and Fig. 15 is a plan view, of the breast-plate removed. Fig. 16 is a side elevation of the knotting mechanism, showing the knotter-operating wheel in section. Fig. 17 is a detailed view of the frame-piece C and connected parts. Fig. 18 is an elevation of the shoe G, and Fig. 19 is a perspective view of the cup F.

The main frame A of the knotter device consists of two parallel tubular horizontal sleeves A′ A², secured by a corresponding end of each to a vertical standard A³, which latter may be integral with these laterally-projecting sleeves, if preferred.

The main frame A is secured on the grain-table of a grain-harvester machine at a proper point, so that the binding mechanism it supports will be held in position to receive grain and form it into bundles or, as technically termed, "gavels."

Within the upper sleeve A′ a shaft $a$ is placed and allowed to rotate freely. This shaft projects through the sleeve at each of its ends. A double crank $b$ is mounted and secured to the end of the shaft $a$ which is adjacent to the standard A³, and projects beyond the double crank to receive revoluble motion, and thus actuate the binding device. On the other end of the shaft $a$ a knotter-operating wheel B for the knotter is placed and affixed, the shoulder $a^2$ of which is in running engagement with the end of the sleeve A′. Upon the front side of the sleeve A′ a horizontal bracket-arm A⁴ is formed or secured and extended inwardly therefrom over the binding-table a suitable distance and then turned at a right angle toward the left side of the knotter device, forming a bent extension A⁵. The hub $a^2$ of the knotter-operating wheel B is of such a length that a part of the circular axial orifice formed in it will not be occupied by the shaft $a$, but will afford a socket-recess for a running engagement of the attached knotter-operating wheel with a cylindrical projection $c$, formed on the adjacent side of the frame-piece C, which is also the support of the band-tying mechanism.

The frame-piece C consists of an elongated sleeve having a block C″, formed integral therewith near its upper end, an elliptical enlargement C² immediately below this block, and a cam-hub H, secured near its lower end. Formed integral with one side of the block C″ is the cylindrical projection $c$, and on the opposite side a perforated lug $d$ projects. Beneath this lug and projecting from the enlargement C² is a tongue $n$, and the details of construction of the hub H will be more fully described later on. This frame-piece C is held in a vertical position by the curved arm C′, which is secured by one end to the lug $d$, formed on the frame-piece C. This portion of the arm C′ is bent laterally to clear the periphery of the knotter-operating wheel B, and thence downwardly in a curved line to clear the lower end of the knotting mechanism that is supported by the frame-piece C, thence forwardly and upwardly to be fastened to the right-angle extension A⁵ of the bracket-arm A⁴; or, to be more specific, this curved arm C′ is attached to a metallic breast-plate C², which is superimposed upon the arm C′, and is of a width corresponding to the length of the extension A⁵, on which said plate is bolted or riveted. There is a perforation $a^3$ made in the lug $d$ in axial line with the center of the knotter-operating wheel B, and a reduced extension $a^4$ of the shaft $a$ is located in said hole, projecting beyond the lug $d$, to receive an ejector-arm E, which will be further described.

Upon the cylindrical body of the frame-piece C, joining the parts H and $n$, an inverted hollow cylindrical cup-shaped piece F, forming a part of the cord-holder, is revolubly mounted, an integral perforated hub $e$ being provided at its upper end to afford means whereby the cup is held on the shaft. On the hub $e$ a bevel-pinion $e^2$ is formed or secured, which is opposite the face of the knotter-operating wheel B near its edge. The cup F has a concentric wall F′, connected integrally with its lower edge, their respective diameters being such that an annular channel $f$ is formed between these two circular walls. The top surface of the cup F is cut away on opposite sides of the hub $e$, forming parallel edges $h$ on the portion left remaining, which connects the hollow wall of the cup F with said hub $e$, and it will be seen that the material of the cup-wall is farther removed in vertical alignment with the parallel edges $h$, so as to produce open slots $h'$, that cut through the attaching-base $h^2$ of the cup F and concentric wall F′, thus affording free access to the interior of the cup F at opposite sides of its suspending-hub $e$. The cut edges of the slots $h'$, which are opposite the vertical edges $h$ on the shell of the cup F, are rounded off, and slots $i$ are formed parallel to these rounded edges, so as to produce slightly curved and inclined fingers $k$ on opposite sides of the cup, and it will be noticed that the upper edge of the concentric wall F′ is notched to form a half-circular depression $i^2$ opposite each slot $i$.

On the lower edge of the cup F and concentric wall F′, formed therein, the notches $m\ m$ are cut through these circular walls in line with the slots $h'$, thus affording continuations of the open slots $h'$ across the cup-shell and the concentric wall surrounding the same; and it may be here explained that the base-wall $h^2$ is sloped inwardly and upwardly, as shown in Figs. 3 and 4, to form a clearance between it and the free ends of the knotter-bills, which latter will be described in proper place.

Upon the frame-piece C, outside of the cup F and wall F′, is mounted a concentric mating shoe G. This is supported in place by a pivotal connection of its upper end with a projecting tongue $n$, formed on the side of the frame-piece C, said tongue $n$ having a loose engagement with a slot made through the upwardly-projecting limb $n'$, a dowel-pin or bolt $n^2$ holding the shoe and tongue in engagement. The shoe G is provided with an offset at $o$ and $o'$ to increase its diameter and render it conformable in shape to the general contour of the cup F. At the point $o'$ the circular wall is concentrically channeled from its lower edge upwardly to form a receiving-groove $o^2$, in which the concentric outer wall F' of the cup F is held, so that the two conforming parts F and G have the double walls of their lower ends in proximity without actual contact.

At a point just above the pivotal connection of the shoe G with the frame-piece C a set-bolt $p$ is introduced loosely through a hole in the limb $n'$ and into a tapped hole in the frame-piece C, there being a spiral spring $p'$ placed on the body of this screw-bolt to be compressed by said bolt and exert its expansive force between the limb $n'$ and the head of the set-bolt $p$, thus supporting the lower channeled end of the shoe G, so as to allow it to yield slightly in a lateral direction. The side of the shoe G is cut away vertically to clear the adjoining surface of the knotter-operating wheel B and other parts below said wheel, and at the point $q$ the double walls of the said shoe G are cut away to form similarly-inclined edges $q'$, which slope downwardly and sidewise from $q$ to $r$. At a point $g^6$ opposite the sloping edges $q'$, just mentioned, the lower edge of the shoe G is cut away to clear the notches $m$, formed in the cup F and the concentric wall F'.

The knotter-shaft D is revolubly supported in the frame-piece C, and below the cup F a cam-hub H is secured by a set-screw $h^3$, or similar means, to the lower cylindrical portion of the frame-piece.

The knotter which forms the knot on the band or cord S when it is properly introduced within the holder F G, consists of a lower bill or jaw I, secured to the lower end of the shaft D and projecting at a right angle thereto. The free end of the bill I approaches near to the inclined lower inner edge of the base-wall $h^2$, formed on the inner cup F, and is properly rounded to afford a smooth surface on the extremity. The upper surface of this bill is grooved longitudinally to insure a proper bite upon the cord or tie-band of the gavel. The upper jaw or bill I' is pivoted in a slot made through the body of the lower bill I, to permit a vibration of the upper bill, and on its rear end, which is bent upwardly at about a right angle to the clamping-face of the jaw I', (which is formed and supported to mate the upper grooved surface of the lower bill I,) a loose anti-friction sleeve or roller $h^3$ is mounted.

Upon the side surface of the cam-hub H two rounded projections $g'$ $g^2$ are formed, which are located at right angles to the knotter-bills I I', when the latter are in normal position, or when the knotting device is in adjustment to receive a gavel, these cam projections $g'$ $g^2$ being intended to impinge against the roller $h^3$, and by pushing it outwardly raise the upper bill I' at a proper instant to receive the cord or tie-band S. On the cam-hub H there is also formed or affixed a cam-plate $g^3$, which is curved eccentric to the inner face of the adjacent cup-wall F, this curved cam-plate approaching with its end $g^4$ closer to the knotter-shaft, and thus affording a surface against which the roller $h^3$ is brought into contact when this shaft D is revolved. It will be seen that there is a depression $h^5$ made in one side wall of the cam-hub H about midway between the cam projections $g'$ $g^2$, designed to afford space for the roller $h^3$, and that from the relative position of the cam-plate $g^3$ this plate will have an enforced engagement with said adjacent roller $h^3$, so as to clamp the pivoted upper knotter-bill I' upon the lower bill I when the roller $h^3$ is located between the cam projections $g'$ $g^2$.

Within the lower sleeve $A^2$ of the main bracket-frame A a loose shaft $a^6$ is located. This projects at one end of the sleeve to receive a single crank $b^4$, that is connected to the upper double crank $b$ by a pitman $A^6$, and which transmits rocking motion from the upper driving-shaft $a$ to the lower shaft $a^6$. The relative length of the upper double crank $b$ to that of lower single crank $b^4$ is such that a rocking motion will be given the latter by a complete revolution of the former. Upon the other end of the shaft $a^6$, which extends beyond the free end of the lower sleeve $A^2$, a needle-arm is mounted. This consists in a radius-bar J, the hub of which is fastened to the shaft $a^6$, and on the outer end of the arm an arched needle-body J' is integrally formed, the curvature of this needle representing an arc of a circle. The needle proper is that portion J' of the arc which is curved above the radius-bar J, the other portion $J^2$ acting as a guard to prevent an improper delivery of grain-stalks while a bundle or gavel is being tied.

In order to allow a free rocking movement of the radius-bar J, a slot $t^5$ is cut through the grain breast-plate $C^2$, which slot is of such relative width and length that the needle J' may be freely vibrated through it and allow its point to project above the finger $k$ when so adjusted, it being understood that one of the open slots $h'$ will be in proper adjustment to permit the needle-point to assume this position.

A perforation $t^2$ is made near the point of the needle J' to receive the cord S. This cord is first inserted through the holes $t\ t'$, which are cut through the arch-piece near the attached end of the radius-bar J. It should be mentioned that the cord S is supplied from a reel, (not shown,) which latter is supported at some convenient point on the reaping-machine so as to deliver the strand of cord continuously to the tying mechanism when in use, the holes $t\ t'$ serving to properly lead the cord to the eye-hole $t^2$ and also regulate the tension of the tie-band to prevent an improper looseness of the bight or loop of the cord into which the gavel is introduced during the process of tying a bundle. The length of the curved body of the needle J' is such that when it has completed its upward rocking movement it will project properly to the rear of the band-holding shells F G, and thus carry the cord S over the point of a finger $k$. The slot $t^5$, made in the breast-plate $C^2$, is diminished in width toward its rear end $t^6$, that lies below the cup and shoe F G, and it is also diverted from a straight line in a slightly-diagonal direction, which will locate its terminal end in line with the lower end of the knotter-shaft D.

One of the essential features of this device is to effect the complete tying operation by a compact mechanism driven by a single shaft $a$, and to communicate motion from this shaft to the knotter-shaft D, which is at right angles to it, yet slightly removed from the plane of its axis, I employ a bevel-pinion $u$, which is secured to the upper extremity of the knotter-shaft, so that its teeth may have meshing contact with the teeth of a curved rack $u'$, this latter being affixed at a proper point upon the adjacent face of the knotter-operating wheel B, the rack $u'$ being of such a relative length that it will cause the knotting-bills to revolve completely by its engagement with their supporting-shaft D. There is a circular projecting rib $v$ formed on the face of the knotter-operating wheel B, which is concentric with the axis of this wheel. Said rib is broken away at the terminals of the curved rack $u'$, the ends of the rib being adjacent to the ends of the rack. The rib is designed to prevent any rotative movement of the knotter-shaft when its pinion $u$ is disengaged from the rack $u'$, this arrest of motion being effected by the engagement of a flat side of the fixed collar $u^2$ with the face of the rib $v$ when the rack $u'$ is out of engagement with the pinion $u$.

To effect the tying of a knot in the cord S, it is necessary to communicate a nearly-simultaneous reverse revoluble movement to the inner cup F, which movement is effected by a second curved toothed rack T, formed on the face of the knotter-operating wheel near its peripheral edge, thus adapting it to mesh with the pinion $e^2$, which is affixed to the hub $e$, formed on the upper portion of this cup F. The length of the rack T is so proportioned to the diameter and number of teeth in the bevel-pinion $e^2$ that a half-revolution will be given to the cup F, and this semi-revolution is so timed by the relative location of the rack T with the knotter-shaft-revolving rack $u'$ that the engagement of the two racks with their respective pinions will be alternating, the revoluble motion of the cup F commencing first, it nearly ending its semi-revolution before the knotter-shaft pinion is engaged to rotate said shaft, a rib $u^4$ engaging the flattened collar $u^5$ below the pinion $e^2$ and holding the pinion from displacement when it is not engaged by its rack $u'$. The concurrent revoluble movement of the knotter-shaft D and cup F is such with regard to the rocking shaft $a^6$ that the point of the needle J' will be about opposite the free point of one of the fingers $k$, so that the cord S will be carried across the path of the finger as it is revolved and be caught by said finger, to be carried down to the base of the slot $i$ by a continuation of revoluble movement of the cup F, where it will rest in the notch $i^2$. Here it is securely held, and as the needle returns to its depressed position preparatory to binding another gavel the twine is left somewhere in the same vertical plane which the needle occupies, and to be exact it is drawn tightly over shoulder $k^6$ (shown in Fig. 7) in position to be seized by the finger $k$ with the other end of the twine when the needle is in its extreme elevated position. It will now come in contact with the sloping edges of the double wall of the shoe G, which will bind the end of the cord tightly in between the cup and shoe F and G in an obvious manner, the edges of the parts having the sharpness removed, which, together with the yielding action afforded the shoe G, will prevent the cord from abrasion or being cut off while it is clamped firmly between the parts.

Upon the outer end of the extension $a^4$ of the shaft $a$ an arm E is secured, as has been previously mentioned, which answers a threefold purpose, as will be shown. On the side of the arm E nearest to the knotter-operating wheel B a limb $E^2$ is formed, which projects at right angles to this arm, and on it is secured a knife-blade $w$, that has a sloping cutting edge so located as to move parallel and near to the knotter-bills when the arm on which it is attached receives revoluble motion from the shaft $a$ and passes through the path formed by a slot $h'$ and notch $m$, as shown in Fig. 11. The end of the limb $e^2$, which projects beneath the knotter-bills, serves to aid in stripping the knot from the bills when the knife-blade has severed the strand of the tying-band from the cord ball off of which it has been reeled.

Another important use of the arm E is to assist in ejecting a bundle or gavel after it has been bound by a band, this arm E acting conjunctively with the mating arm N, which latter is secured upon the hub of the knotter-operating wheel B or its blank face. The two arms lying in the same plane are of about equal length, which is sufficient to enable them to properly engage a gavel when it has been bound.

In operation, the end of the tying-cord S having been wedged between the cup F and shoe G at a point about opposite where the needle leaves the thread, (see Fig. 4,) the device will have assumed a position to receive a quantity of unthrashed grain-stalks as they are cut by the reaper, the end of the needle-arm lying below the surface of the grain-table K of the reaper and adapted to rock upwardly through a slot in this table. It is evident that the grain-stalks will form a bundle or gavel in the bight of the cord S, which extends from the cord-holder down through the slot in the breast-plate $C^2$, and a continuation of revoluble movement of the shaft $a$ will carry the needle upward, causing it to describe an arc of a circle in its rocking movement until its point has passed over the adjacent finger $k$, the cup F, on which it is formed, having made a half-revolution meanwhile, so as to allow this finger to engage the cord S in a manner precisely similar to that of the other mating finger $k$, which is holding the end of the tie-band. The upward movement of the needle-arm forces the grain-stalks into a compact bundle by the conjoint action of the breast-plate $C^2$, which, it will be noticed, inclines downwardly, so as to afford a compressing action on the straw that is being bound into a gavel, and as the needle progresses toward the terminus of its rocking movement over the holding cup and shoe F G they clamp the uncut string or cord S, which has been tightly drawn around the gavel. When the cord S has been made to encompass a gavel in the manner just stated, the doubled strands will be located within the cup F, just in line with the knotting-bills I I', and the curved racks, which give motion to the cup F and knotter-shaft D, engage these parts and rotate them in opposite directions, which will lift the top knotter-bill, admit the double strands of the cord between the bills, and close the top bill upon them. Now at this stage of the operation the knife-blade $w$ is near the taut strands of the cord, and will by a further advance movement cut the doubled cord S between the cord-holder and knot near to the knot, which has been previously completed by the pressure of the ejector-arms against the side of the gavel, forcing the loop off of the knotter-bills I I', stripping it over the clamped ends of the cord and tying a hard knot thereon. The bundle being now free is thrown off the grain-table by the projecting action of the arms E M, while the cut end of the cord wedged between the cup and shoe is still held securely during the process of tying another bundle. When a gavel has been tied and ejected, the operation may be instantly repeated, as the guard portion of the needle-arm will have held the cut grain so that a downward rocking movement of the needle J', laying the cord in the slot $h'$ beneath it, will allow another bundle to form in the bight of the cord, it being apparent that the revoluble movement of the cup F has again carried the end of the cord lying in the slot $i$ below the sloping wall of the shoe G and locked it firmly.

Many slight changes can be made in the form of the parts of this device without a departure from the spirit or exceeding the scope of my invention; hence I do not wish to restrict myself to the exact forms herein shown; but, Having fully described my invention, what I claim as new, and desire to secure by Letters Patent, is—

1. In a knotting device for grain-binders, the combination, with a pair of clamping knotter-bills, a cam-hub on the bearing supporting the knotter-bills, and a cam-plate eccentric with the axis of the knotter-bills, of a cord-holding cup loosely mounted concentric with the shaft of the knotter-bills and adapted to make part revolutions in a direction opposite the direction of movement of said bills, and a cord-holding shoe carried by the bearing supporting the knotter-shaft, substantially as set forth.

2. The combination, with a knotter-shaft having a movable bill and a stationary bill and adapted to turn in one direction, of a cord-holding cup supported about a common axis with that of the knotter-shaft and adapted to move in a direction opposite the direction of movement of said shaft, a cord-holding shoe, a wheel for rotating the knotter-shaft and cord-holding cup, and a stationary cam-hub and stationary cam-plate for engaging the movable bill, substantially as set forth.

3. In a knotting device for grain-binders, the combination, with a frame-piece and a knotter-shaft adapted to turn therein in one direction, of a cord-holding cup loosely mounted on said frame concentric with the shaft and adapted to make half-revolutions in the opposite directions, substantially as set forth.

4. In a knotting device for grain-binders, the combination, with a knotter-shaft adapted to move in one direction only, of a cord-holding cup supported about a common axis with that of the knotter-shaft and adapted to move in a direction opposite the direction of movement of the knotter-shaft, substantially as set forth.

5. In a knotting device, the combination, with a knotter-shaft, a cord-holding cup revolubly supported about a common axis with that of the knotter-shaft, and a shoe acting in conjunction with the cup for clamping the cord, of means for rotating the bills in one direction and the cup in the opposite direction, substantially as set forth.

6. In a knotting device for grain-binders, the combination, with a frame-piece and a knotter-shaft adapted to turn therein in one direction, of a cord-holding cup loosely mounted on said frame concentric with the shaft and adapted to make half-revolutions in the opposite direction, and a cord-holding shoe attached to the frame-piece, substantially as set forth.

7. In a knotting device for grain-binders, the combination, with a knotter-shaft having a movable bill and a stationary bill, and a frame-piece having a cam-hub and a cam-plate at its lower end for actuating the movable bill, of a cord-holding cup supported about a common axis with that of the knotter-shaft, a wheel for rotating the knotter-shaft in one direction and the cord-holding cup in the opposite direction, and a cord-holding shoe, the said cup and shoe having overlapping lips, substantially as set forth.

8. In a cord-knotter for grain-binders, the combination, with a frame-piece, of a knotter-shaft and knotter, a cord-holding cup inclosing or surrounding the knotter, the said knotter-shaft and cup being revolubly supported by the frame-piece, and a yieldingly-supported semicircular cord-holding shoe having a grooved lower edge in which the upturned lower edge of the cup rests and moves.

9. In a knotting device for grain-binders, the combination, with a frame-piece, a knotter-shaft, and concentric cord-holding cup and shoe, of a knotter-operating shaft, and gavel-ejecting arm secured thereto, said arm carrying a knife, substantially as set forth.

10. In a cord-knotter for grain-binders, the combination, with a frame-piece and knotting mechanism supported thereon, of a knotter-operating shaft revolubly supported therein, and a gavel-ejector arm secured to said shaft, this arm carrying a knife, substantially as set forth.

11. In a cord-knotter, the combination, with a frame-piece and knotting mechanism supported thereon, of a binder-operating shaft revolubly supported in said frame-piece, a knotter-operating wheel fixed to this shaft, and gavel-ejector arms, one secured to the wheel and the other to the shaft, the latter one carrying a knife, substantially as set forth.

12. In a knotting device for grain-binders, the combination, with a frame-piece, a knotter-shaft adapted to turn therein in one direction, the said shaft carrying a stationary bill and a movable bill, a cam-hub and a cam-plate for actuating the movable bill, of a cord-holding cup loosely mounted on said frame concentric with the shaft and adapted to rotate in a direction opposite the direction of movement of the shaft, curved fingers carried by said cup for engaging the cord, a cord-holding shoe attached to the frame-piece, and a single wheel for rotating the shaft and cup, substantially as set forth.

13. In a knotting device for grain-binders, the combination, with a revoluble knotter-shaft, of a fixed cord-clamping shoe and a revoluble cord-holding cup supported about a common axis with that of the knotter-shaft, the said cup having two fingers adapted to alternately engage the cord and carry it between the shoe and the cup, the said cup adapted to make half-revolutions in a direction opposite the direction of movement of the knotter-shaft, substantially as set forth.

14. In a knotting device for a grain-binder, the combination, with a frame, a driving-shaft, a rocking shaft, means to transmit motion from the driving-shaft to the rocking shaft, and a curved needle attached to the end of the rocking shaft, of a knotter-shaft, knotter-bills, concentric cord-holding cup and shoe, a cam-hub, a cam-plate, and a wheel mounted on the driving-shaft and adapted to rotate the knotter-bills and cord-holding inner shell in an opposite direction to the motion of the knotter-bills, substantially as set forth.

15. In a knotting device for a grain-binder, the combination, with a driving-shaft, of two parallel ejector-arms mounted on and moved together by the driving-shaft, one of said arms carrying a knife-blade, substantially as set forth.

16. In a knotting device for a grain-binder, the combination, with a frame, a knotter, and a driving-shaft therefor loosely mounted in a sleeve of the frame, of two parallel ejector-arms, from one of which projects laterally a knife-blade which is located between the ejector-arms, substantially as set forth.

17. In a knotting device for a grain-binder, the combination, with a frame, a driving-shaft, a knotter-operating wheel, a knotter-shaft, a cam-hub, a cam-plate, knotter-bills that are opened and closed by the cam hub and plate, and a cord holding cup and shoe concentric with each other and located around the knotter-bill to clamp a tying-cord between them, of a rocking shaft, means to transmit motion from the driving-shaft to the rocking shaft, a curved needle secured to the end of the rocking shaft to carry the tying-cord within the clamping-shells, two parallel ejector-arms which coact with the knotter-bills to finish a knot by stripping a formed loop from off the knotter-bills, and a knife-blade attached to the side of one ejector-arm, which is adapted to sever the cord outside of a completed knot to allow the mated ejector-arms to throw out the tied gavel, substantially as set forth.

In testimony whereof I have signed this specification in the presence of two subscribing witnesses.

ALVIN O. CARMAN.

Witnesses:
GEORGE M. FERRIS,
IRA C. JENNINGS.